(12) United States Patent
Cohen

(10) Patent No.: US 8,226,017 B2
(45) Date of Patent: Jul. 24, 2012

(54) MULTIPURPOSE FLUID DISTRIBUTION SYSTEM

(75) Inventor: Bryce Dean Cohen, Littleton, CO (US)

(73) Assignee: Fire Away Technologies, Englewood, CO (US)

( * ) Notice: Subject to any disclaimer, the term of this patent is extended or adjusted under 35 U.S.C. 154(b) by 477 days.

(21) Appl. No.: 12/559,299

(22) Filed: Sep. 14, 2009

(65) Prior Publication Data

US 2010/0000743 A1 Jan. 7, 2010

Related U.S. Application Data

(63) Continuation-in-part of application No. 11/215,593, filed on Aug. 30, 2005, now abandoned.

(51) Int. Cl.
  *B05B 15/00* (2006.01)
(52) U.S. Cl. .............................. 239/450; 239/69; 239/11
(58) Field of Classification Search .................. 239/450, 239/398, 407, 409, 413, 63, 66, 67, 69, 207, 239/550, 551, 1, 11
See application file for complete search history.

(56) References Cited

U.S. PATENT DOCUMENTS

| | | | |
|---|---|---|---|
| 4,428,434 A | 1/1984 | Gelaude |
| 4,991,657 A | 2/1991 | LeLande, Jr. |
| 5,125,458 A | 6/1992 | Berman |
| 5,165,482 A | 11/1992 | Smagac et al. |
| 5,692,571 A | 12/1997 | Jackson |
| 5,732,511 A | 3/1998 | Scott |
| 5,909,983 A | 6/1999 | McGee, Jr. |
| 5,931,233 A | 8/1999 | La Bonte et al. |
| 6,167,971 B1 | 1/2001 | Van Lingen |
| 6,315,523 B1 | 11/2001 | Mills |
| 6,450,264 B1 | 9/2002 | Christian |
| 6,629,569 B1 | 10/2003 | Adams |
| 6,679,337 B1 | 1/2004 | Perry et al. |
| 6,685,104 B1 | 2/2004 | Float et al. |
| 6,772,562 B1 | 8/2004 | Dadamo |
| 7,048,068 B2 | 5/2006 | Paulkovich |
| 2007/0044978 A1 | 3/2007 | Cohen |

OTHER PUBLICATIONS

International Association of Fire Chiefs, Fundamentals of Fire Fighting Skills, Jones & Bartlett Publishers, 2008, p. 598-613 and 934-969.

(Continued)

*Primary Examiner* — Davis Hwu
(74) *Attorney, Agent, or Firm* — James M. Weatherly; Cochran Freund & Young LLC

(57) ABSTRACT

A multipurpose fluid distribution system including a network of fluid distribution heads associated with a landscape. Also included is a water supply feeding the network of fluid distribution heads. The fluid distribution heads may be typical irrigation or sprinkler heads or specialized heads useful for reaching portions of the outside of a structure or landscape which are not typically irrigated such as the roofs of buildings. Also included in the multipurpose fluid distribution system is a series of distribution valves operatively disposed between the water supply and the network of fluid distribution heads. The system can be controlled with a control unit associated with the distribution valves which is configured to automatically open select distribution valves or open select distribution valves according to manual input. The control unit is configured to open certain valves under predetermined conditions or upon a select schedule for the routine irrigation of the landscape with water from the water supply. In addition, the control unit is configured to open select distribution valves for the nonroutine application of water to the landscape in the event a humidity sensor or fire sensor associated with the control unit detects an approaching wildland fire.

9 Claims, 1 Drawing Sheet

OTHER PUBLICATIONS

Restriction Requirement mailed Dec. 12, 2007, for U.S. Appl. No. 11/215,593, published as 20070044978.
Non-final Office Action mailed Jan. 31, 2008, for U.S. Appl. No. 11/215,593, published as 20070044978.
Final Office Action mailed Jul. 1, 2008, for U.S. Appl. No. 11/215,593, published as 20070044978.
Non-final Office Action mailed Oct. 8, 2008, for U.S. Appl. No. 11/215,593, published as 20070044978.
Examiner interview summary, Dec. 18, 2008, for U.S. Appl. No. 11/215,593, published as 20070044978.
Final Office Action mailed Mar. 13, 2009, for U.S. Appl. No. 11/215,593, published as 20070044978.

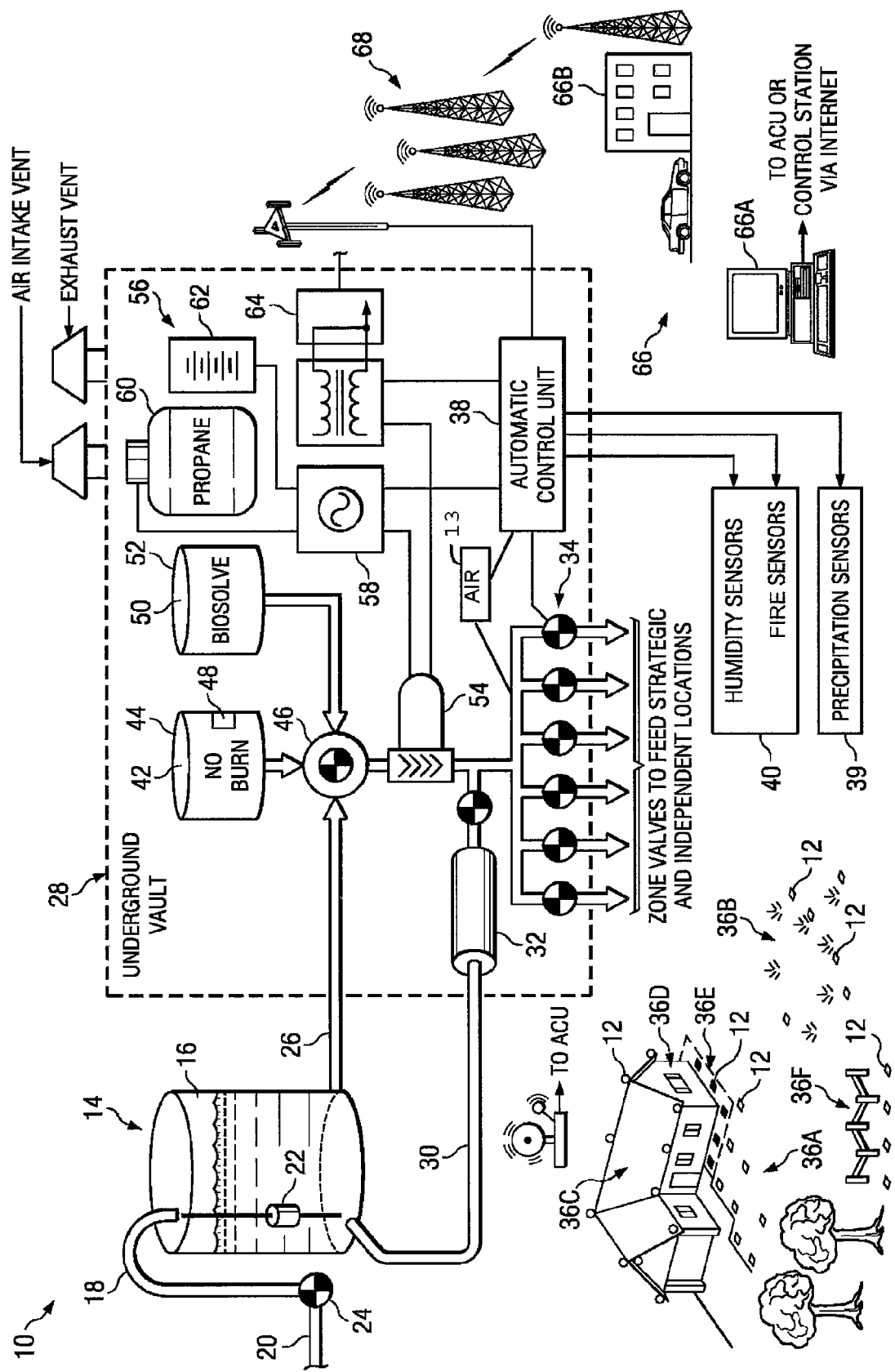

MULTIPURPOSE FLUID DISTRIBUTION SYSTEM

CROSS-REFERENCE

This application is a continuation-in-part of U.S. patent application Ser. No. 11/215,593 filed on Aug. 30, 2005, which is herein incorporated by reference in its entirety. All publications cited in this application are herein incorporated by reference.

TECHNICAL FIELD

The present invention is directed toward a multipurpose fluid distribution system, and more particularly toward an automated system for the routine irrigation of an outside landscape and nonroutine application of water, fire suppressant, or fire retardant fluid to a landscape and to the outside of associated structures in the event of an actual fire on the premises or the threat of an approaching fire.

BACKGROUND ART

Wildfires or wildland fires are an annual occurrence in arid or semiarid regions of the United States, such as southern California and Colorado. Wildland fires are often ignited by natural phenomena, such as lightning storms, or are caused by human negligence. Once a wildland fire is ignited, it may consume substantial acreage which can include valuable residential or commercial structures and associated landscaping.

Often, a relatively small wildland fire can be contained by local authorities before significant damage to structures or landscaping occurs. However, in the case of a large, fast moving, and uncontained wildland fire, firefighting authorities may be unable to contain the progress of the wildland fire before significant property damage occurs. In such an instance, it would be extremely foolhardy for a property owner to attempt to manually apply fire retardant or fire suppressant to his or her structures or landscape. The risk of injury or death is simply too great to justify manual fire suppression efforts.

Several systems for home and property protection from wildland fires are known. Typically, the prior art systems are more or less automated, and feature the application of a fire retardant or suppressant, such as water or a chemical designed for fire control, to structures and landscape as a wildland fire approaches. The prior art systems are manually actuated or triggered by various types of fire sensors and detectors. The prior art systems all feature dedicated fire sensors, spray heads, sprinklers, or other application nozzles of various configurations implemented to direct fire control fluids toward structures and landscape features.

The prior art automated fire suppression systems are designed to fulfill a single purpose. These systems protect real property from approaching wildland fires by applying fire retardant or suppression fluids. The prior art systems can be rather complex, costly, and maintenance intensive. Thus, a substantial disadvantage of the prior art systems is the large investment a property owner must make in an automated system which hopefully will never be used. For many property owners, the investment in a single purpose system is too large to justify the potential benefit of the protection of landscaping and structures in the event of a wildland fire.

Wildland fires are naturally more common in arid and semiarid regions of the country. These same regions, for example, the west and southwest portions of the United States, are also the regions where landscape irrigation is most necessary if a well-planted and thriving landscape is to be maintained through the summer and fall months. An appropriate automated irrigation system is also a substantial investment made by many property owners in arid and semiarid regions of the country. Prior art exterior landscape and structure fire suppression systems and prior art irrigation systems are each relatively complex and potentially expensive systems, each of which is directed toward a single purpose.

The present invention is directed toward overcoming one or more of the problems discussed above. The foregoing examples of the related art and limitations related therewith are intended to be illustrative and not exclusive. Other limitations of the related art will become apparent to those of skill in the art upon a reading of the specification.

SUMMARY OF THE INVENTION

The following embodiments and aspects thereof are described in conjunction with systems, tools, and methods which are meant to be exemplary, not limiting in scope. In various embodiments, one or more of the above-described problems have been reduced or eliminated, while other embodiments are directed to other improvements.

One aspect of the present invention is a multipurpose fluid distribution system including a network of fluid distribution heads associated with a landscape or the outside of a structure. Also included is a water supply feeding the network of fluid distribution heads. The fluid distribution heads may be typical irrigation or sprinkler heads or specialized heads useful for reaching external portions of a structure or landscape which are not typically irrigated, such as the roofs of buildings.

Also included in the multipurpose fluid distribution system is a series of distribution valves operatively disposed between the water supply and the network of fluid distribution heads. The system can be controlled with a control unit associated with the distribution valves which is configured to automatically open select distribution valves or open select distribution valves according to input. The control unit is configured to open certain valves under predetermined conditions or upon a select schedule for the routine irrigation of the landscape with water from the water supply. In addition, the control unit is configured to open select distribution valves for the nonroutine application of compressed air to clean out the system, followed by water, fire retardant, or fire suppressant to the landscape in the event a sensor, such as a humidity sensor or a fire sensor, associated with the control unit detects an approaching wildland fire.

The multipurpose fluid distribution system may have a portion of the network of fluid distribution heads specifically associated with the outside of a structure situated on the landscape. In addition, a fire retardant supply separate from the water supply may be connected in fluid communication with the series of valves. In such an instance, input from the humidity sensor may cause the control unit to open select distribution valves causing the application of compressed air from an on-site air compressor to clean out the system of any unwanted fluids and then the application of fire retardant to the outside of a structure or landscape. The system may further include a mixing valve receiving input from both the water supply and the fire retardant supply in fluid communication with the series of distribution valves. Thus, input from the humidity sensor can cause the control unit to open select distribution valves causing the application of compressed air and then a mixture of water and/or fire retardant to the outside of a structure or various aspects of the landscape. Similarly, an alternative or third fluid supply of fire suppressant may be included in the system. Thus, the system may be configured to selectively apply one, a group of, or all of the available fluids, water, fire suppressant, and fire retardant, through select distribution valves upon input from the fire sensor.

Another aspect of the present invention includes a dedicated variable speed pump in fluid communication with one or more of the fluid supplies and the series of distribution valves. The system may also include a backup power supply in electrical communication with the pump. In this aspect of the present invention, fluid may be applied to the landscape or the outside of a structure in the event that normal utility services are disrupted. The backup power supply may include a generator configured to supply electricity to the pump and a battery which is suitable for supplying necessary electricity to start the generator. In addition, a switch may be included in the system which allows the selective application of electrical power to the system from the backup electrical power supply. In the event of a non-fire related power failure in the normal utility service, the backup generator may also supply electrical backup power back to electrical appliances and apparatuses associated with the landscape or structure.

Another aspect of the present invention is a multipurpose fluid distribution system including a remote control unit located away from the automatic control unit and in communication with the automatic control unit. For example, the remote control unit might be a computer located at another property accessible to the property owner. Alternatively, the remote control unit could be located with an agency hired by the property owner to monitor signals from the fire sensor or other alarms. The remote control unit may be configured to send commands to the control unit, causing the control unit to open select distribution valves for nonroutine application of water or fire suppressant/retardant chemicals to the landscape or the outside of a structure for fire control. It is advantageous to have the remote control unit communicate with the control unit over a wireless communication link. Thus, communication with the control unit can be maintained in the event telephone lines or other conventional communication links are disrupted by a wildland fire.

The humidity sensors included in the system may be configured to detect a drop in humidity preceding a wildland fire. The fire sensor included in the system may be a temperature or heat sensor configured to detect the rise in temperature preceding a wildland fire. Furthermore, the system may include a precipitation sensor, also in communication with the control unit and providing input to the control unit, optimizing the control of routine irrigation activities.

Another aspect of the present invention is a method of automatically distributing fluids to various portions of a landscape and the outside of associated structures, said method being implemented with the apparatus described above.

In addition to the exemplary aspects and embodiments described above, further aspects and embodiments will become apparent by study of the following descriptions.

BRIEF DESCRIPTION OF THE DRAWINGS

FIG. 1 is a schematic diagram of a multipurpose fluid distribution system consistent with the present invention.

DEFINITIONS

In the description and tables that follow, a number of terms are used. In order to provide a clear and consistent understanding of the specification and claims, including the scope to be given such terms, the following definitions are provided:

Air Compressor. As used herein, an air compressor is a device used to supply high-pressure clean air to remove fluid and materials from the system of the present invention. The air compressor of the present invention pumps a minimum of 25 cfm (cubic feet per minute) up to 150 cfm.

Decrease in Humidity. A decrease in humidity as used herein is a drop in humidity over a very short period of time that is identified by the system of the present invention as a potential indication of the presence of a fire. The time and amount of decrease in humidity necessary to initiate the system of the present invention will vary depending on the average atmospheric conditions found in an area as well as the time of year. A drop in humidity that initiates the system of the present invention to switch from irrigation mode to fire fighting mode may range anywhere from as low as 1% to as high as a 90% drop in humidity.

Fire Retardant. As used herein, fire retardant is a substance that helps delay or prevent combustion of materials. Fire retardants can include, but are not limited to, water and chemicals, including foams and gels.

Fire Suppressant. As used herein, fire suppressant is a substance, such as water or foam, used to extinguish the flaming and glowing phases of combustion when directly applied to burning fuels. Fire suppressants can include, but are not limited to, water, gases, and chemicals.

Landscape. As used herein, a landscape comprises the visible features of an area, including, but not limited to, lawns, open fields, roof tops, bedding plant zones, a perimeter, or exterior wall.

Outdoor or Outside. As used herein, outdoor or outside shall refer to all areas excluding the internal area of a structure or a building, including, but not limited to, landscapes, lawns, open fields, roof tops, bedding plant zones, a perimeter, or exterior wall.

Outside of a Structure. As used herein, the outside of a structure includes, but is not limited to, a structures exterior walls and roof top.

Relative Humidity. Relative humidity (RH) is the ratio of the amount of moisture in the air (water vapor) compared to the amount that the air could hold at the same temperature and pressure if it were saturated. Low humidity in the air takes moisture out of fuels whereas high humidity allows more moisture in the air to be absorbed into fuels. When a fuel has more moisture, it is harder to ignite and burn.

Variable Speed Pump. As used herein, a variable speed pump is a pump capable of distributing the same fluid in differing volume requirements throughout a premise or various fluids with different viscosities and weights at the same speed, trajectory, and distance to ensure that the different fluids reach the same area of need. The variable speed pump of the present invention has the capacity to pump between 2 gallons per minute up to 200 gallons per minute.

Wildland Fire or Wildfire. As used herein is any fire that occurs outside of a structure, in the countryside, or a wilderness area.

DETAILED DESCRIPTION OF THE PREFERRED EMBODIMENT

Fire prevention and fire protection is a multibillion dollar industry and requires a complex understanding of the intricate factors that affect a wildland and structural fire.

When monitoring, preventing, and fighting a wildland fire, it is important to note that a wildland fire is fundamentally different from a structural fire. Some of the key differences between a wildland fire and a structural fire include, but are not limited to: (a) the development of a structural fire is generally limited to the amount of oxygen available within the structure, while in a wildland fire the supply of oxygen is unlimited; (b) in a structural fire the fire is generally confined to the structure itself, while in a wildland fire the fire is not confined and may jump natural or unnatural barriers such as road, ridges, rivers, or canyons; (c) in a structural fire the fire is dependent and limited to the materials used in the buildings construction, while in a wildland fire fuels can vary from area to area and can include hardwoods to softwoods, leaves and shrubs to grass, or a combination; (d) interior structure fires are not affected by wind or other weather conditions such as humidity, while in a wildland fire weather including humidity, wind, temperature, and precipitation are the primary factors affecting a fire; and (e) in a structural fire, because the fire is confined within a building, heat and gases build up within the structure increasing the potential of explosions, while in a wildland fire heat and gases are not able to build up because they are vented into the atmosphere.

There are three primary stages to a fire. The first stage of a structural or wildland fire is the smoldering stage. When heat is applied to a combustible material, the heat oxidizes the material's surface into combustible gases. The oxidation process is exothermic, meaning that the oxidation process itself produces heat. The heat from oxidation raises the temperature of surrounding materials, which increases the rate of oxidation and begins a chemical chain reaction of releasing heat and burning of the materials. A fire can progress from the smoldering phase immediately or slowly, depending upon the type of fire, the structure, the fuel types, and the availability of oxygen in the surrounding air.

The second stage of a fire is visible flames. When the temperature of a fire gets high enough, visible flames can be seen. The visible burning at this stage is still limited to the immediate area of the origin of the fire. The combustible process continues to release more heat, which heats nearby objects to their ignition temperature, and burning of these materials also begins.

In the third stage of a fire, the difference between a wildland fire and a structural fire becomes apparent. In a wildland fire the surrounding growth will ignite and the flames will spread quickly depending upon the wind speed and humidity in the area. Because a wildland fire is not in an enclosed structure, the gases released from combustion are able to be easily distributed by the rise of the gases as well as wind.

A structure fire is different from a wildland fire because the gaseous products of combustion, most of which are flammable and lighter than air, rise and are contained in the upper levels of the structure. When this occurs, the structure fire is at a critical point, either the fire has insufficient oxygen available to burn and it progresses back to the smoldering stage, or it has sufficient oxygen available to move on to the flashpoint stage. The flashpoint stage is the most significant moment of any structure fire. As combustible gases are produced by the two previous stages, they are not wholly consumed and can rise and form a superheated gas layer at the ceiling of the structure. As the volume of this gas layer increases, it begins to bank down to the floor, heating all combustible objects regardless of their proximity to the burning object. In a typical structure fire, the gas layer at the ceiling can quickly reach temperatures of 1500 degrees Fahrenheit. If there is enough existing oxygen, usually near floor level, flashpoint occurs and everything in the room breaks out into open flame at once. The instantaneous eruption into flame generates a tremendous amount of heat, smoke, and pressure with enough force to push beyond the room of origin through doors and windows. The combustion process then speeds up because it has an even greater amount of heat to move to unburned objects.

Once a wildland fire has started, the growth of the fire is influenced by several factors including the weather and by the topography of the land involved in the fire (International Association of Fire Chiefs, Fundamentals of Fire Fighting Skills, Jones & Bartlett Publishers, 2008, p. 602). The two most critical weather conditions that influence wildland fire are moisture and wind. Id. Moisture can be present in the form of either relative humidity or precipitation. When relative humidity is low, vegetative fuels dry out, making them more susceptible to ignition.

Unlike a structure fire, one factor that is used to predict the presence, likelihood, or movement of a wildland fire is relative humidity. Low humidity takes moisture from the fuels causing fuels to quickly dry out. Light fuels or fine fuels, such as grass and pine needles, gain and lose moisture quickly with changes in relative humidity. When the relative humidity drops, wildland fire behavior increases because fine fuels, such as grasses and leaves, become drier.

In the present invention, a multipurpose fluid distribution system 10 is shown schematically in FIG. 1. The system 10 includes a network of fluid distribution heads 12 associated with a landscape. The individual fluid distribution heads 12 of the network may be selected from various available types to accomplish specific irrigation and/or fire control purposes, depending on the location of the particular head 12. All of the various types of irrigation heads known in the irrigating arts are suitable for the implementation of the present invention. For example, conventional pop-up sprinkler heads may be associated with grassy areas of a landscape; gear driven heads may be installed in open fields; microjets and drip emitters may be installed in flower or vegetable beds. The foregoing list of possible heads is not exhaustive, and is not intended to be limiting in any way. Because of the multipurpose nature of the present fluid distribution system 10, it is desirable that individual heads 12 used above ground be made of heat tolerant material such as brass or copper. As is discussed in detail below, certain heads 12 may be associated with structures or placed in other nontypical locations.

The multipurpose fluid distribution system 10 also includes a water supply 14. As shown in FIG. 1, the water supply 14 may be a standalone tank 16 such as a conventional water storage tank. The tank 16 may be associated with a fill tube 18 connected to a constant pressure water source 20 such as a municipal water supply. A float device 22 configured to open a fill valve 24 may be employed to assure that the water level in the tank 16 does not drop below a designated level.

Alternatively, the water supply 14 may be a direct tap to a constant pressure water source 20 such as a municipal water supply. In addition, other water holding structures, such as swimming pools or natural water supplies, i.e., wells, ponds, or rivers, could be implemented as the water supply 14 of the present invention.

The tank 16 may be situated above or below ground. It is desirable, but not required, that any tank 16 used as a water supply 14 have a capacity of at least 10,000 gallons. A tank 16 of this size would have the capacity to supply water through six conventional irrigation zones with the irrigation heads 12 running simultaneously at the rate of 14 gallons/minute for two hours.

A screened and/or filtered draw tube 26 may be employed to move water by gravity toward an above ground or underground vault 28 housing other components of the multipurpose fluid distribution system 10. The draw tube 26 must be sized with an appropriate diameter to supply water sufficient to run all irrigation or fire control zones simultaneously.

It is also desirable to have one or more circulation tubes 30 plumbed into the system 10 to provide for the slow circulation of stored water which might otherwise become stagnant. In addition, a heater 32 may be associated with the circulation tube 30 to prevent the freezing of water throughout the system 10 in the winter. The heater 32 may be located within the above ground or underground vault 28.

The multipurpose fluid distribution system 10 will also include a series of distribution valves 34 disposed in fluid communication between the water supply 14, an air compressor 13, and the network of fluid distribution heads 12. Typically, multiple heads 12 will be fed from each of the distribution valves 34. It is customary to refer to a group of heads 12 supplied by each distribution valve 34 as a zone 36. Numerous types of zones 36 may be configured for the implementation of the system 10. FIG. 1 illustrates a lawn zone 36A, an open field zone 36B, a roof top zone 36C, an exterior wall zone 36D, a bedded plant zone 36E, and a perimeter zone 36F. The present invention is not limited to these zones 36; any suitable zone 36 may be configured at the discretion of the property owner within the scope of the present invention. The type and distribution of zones 36 will be determined by the features of the landscape and the presence of various structures. The distribution valves 34 feeding each zone 36 may be implemented with commonly available distribution valves 34. Typically, such distribution valves 34 are controlled electromechanically by solenoids and diaphragms. Other types of distribution valves 34 are suitable for the implementation of the present invention.

The system 10 also includes an automatic control unit, or control unit 38. The control unit 38 is configured to electrically actuate the valves 34 for multiple purposes. The control unit 38 may be configured to open select valves 34 according to a select schedule for the routine irrigation of landscape features. The control unit 38 may be programmed to open distribution valves 34 daily, tri-weekly, or upon whatever routine schedule is appropriate for the landscape features being watered. In addition, the control unit 38 may be programmed to open distribution valves 34 under predetermined conditions relevant to irrigation. For example, a soil moisture sensor or precipitation sensor 39 may provide an input to the control unit 38, said input causing supplemental irrigation.

Additionally, the control unit 38 may be configured to receive an input from a humidity sensor 40 indicating the approach of a wildland fire. The humidity sensor 40 may be designed to detect the precipitous drop in humidity which precedes a wildland fire front. Similarly, the fire sensor 40 may be a temperature or heat sensor designed to detect the dramatic rise in heat preceding a wildland fire. The humidity sensor or fire sensors 40 may also be configured to analyze the likelihood of a fire event based upon environmental conditions. Upon receipt of input from the fire sensor 40, the control unit 38 may open select distribution valves 34 to use air from the air compressor 13 to purge the system 10 of water in order to allow for the nonroutine application of fire retardant or fire suppressant to the landscape or nonroutine application of retardant to structures for fire control.

As is shown in FIG. 1, certain zones, zone 36C for example, may include fluid distribution heads 12 specifically associated with the outside of a structure or a landscape. In addition, the system 10 may include a fire retardant supply 42 in fluid communication with the series of distribution valves 34. Thus, input from the humidity sensor 40 can cause the control unit 38 to open select distribution valves 34 for the application of fire retardant from the fire retardant supply 42 to the outside of the structure or select landscape features.

The fire retardant supply 42 may be held in a tank 44 such as a molded plastic tank which can be readily obtained in various sizes and shapes. Typically, the fire retardant tank 44 will be maintained above or in the underground vault 28. However, the present invention is not limited to such a configuration. An appropriate size for a fire retardant tank 44 installed on a typical residential property is 50 to 200 gallons. However, the ultimate size chosen for the fire retardant supply 42 will depend on the type of retardant used and the total square footage of surface potentially requiring coverage.

Some fire retardants are delivered in concentrated form. Such retardants are designed to be mixed with water immediately prior to application. Mixing can be accomplished with a mixing valve 46 receiving input from the water supply 14 and the fire retardant supply 42, said mixing valve 46 having an output in fluid communication with the series of distribution valves 34. Thus, input from the humidity sensor 40 can cause the control unit 38 to open select distribution valves 34, providing for the application of a mixture of water and fire retardant to a structure or landscape through appropriate zones 36.

Other types of retardant are delivered for use without mixing, eliminating the need for a mixing valve 46. In any installation, a refill notification gauge 48 would preferably be associated with the fire retardant tank 44 to assure that the fire retardant supply 42 is maintained at an appropriate level.

In addition to a fire retardant supply 42 which contains retardant specifically designed to be sprayed on a structure or landscape prior to a fire, and thus inhibit the ignition of the structure or landscape features, the system 10 may include a fire suppressant supply 50. Fire suppressant from the fire suppressant supply 50 may be applied to the landscape and structures in conjunction with retardant. However, suppressant is specifically formulated to put out actively burning fires.

The fire suppressant supply 50 may also be maintained in a suitably sized tank 52. Like the fire retardant supply 42, the fire suppressant supply 50 may be connected in fluid communication with the mixing valve 46, allowing the control unit 38 to distribute a mixture of water from the water supply 14 and suppressant from the suppressant supply 50 to appropriate zones 36. Typically, the fire suppressant tank 52 will also be in the 50 to 200 gallon range for a residential installation, with the ultimate size depending on any selected water to suppressant ratio and the total square footage of surface to cover. Preferably, the control unit 38 will be programmed to apply suppressant over intervals or through cycles in the event of a fire so that the suppressant supply 50 does not run out before all active burn areas are extinguished.

Some fire suppressants are delivered in concentrated form. Such suppressants are designed to be mixed with water immediately prior to application. Mixing can be accomplished with a mixing valve 46 receiving input from the water supply 14 and the fire suppressant supply 50, said mixing valve 46 having an output in fluid communication with the series of distribution valves 34. Thus, input from the fire sensor 40 can cause the control unit 38 to open select distribution valves 34, providing for the application of a mixture of water and fire suppressant to a structure or landscape through appropriate zones 36.

The approach of a wildland fire is quite likely to disrupt utility service to the property upon which the multipurpose fluid distribution system 10 is installed. The possible disruption of utility service emphasizes the advisability of maintaining the various fluid supplies 14, 42, 50 in tanks 16, 44, 52, respectively, rather than relying on municipal water supplies for fire control efforts. In addition, it is likely that electrical service and conventional communication lines, such as telephone service, will be disrupted by an approaching wildland fire. Accordingly, it is desirable to have a dedicated variable speed pump 54 or multiple pumps included in the system 10 to pump fluid from the various supplies 14, 42, 50 through the distribution valves 34 to various zones 36. The dedicated variable speed pump 54 may be sized according to system 10 requirements, and will preferably have an interface in communication with the control unit 38. Also, the variable speed pump 54 may be connected to multiple alternative power sources including general utility service or a backup power supply 56 which may be implemented in the event normal power is disrupted.

It is advantageous to configure the backup power supply 56 to assure that all subsystems associated with the multipurpose fluid distribution system 10 remain operational in the event electrical power is interrupted. For example, the backup power supply 56 may include an A/C generator 58 suitable for supplying alternating current having a voltage and amperage sufficient to operate the variable speed pump 54. The A/C generator will have a dedicated fuel source such as the propane supply 60 shown in FIG. 1. In addition, a backup battery power supply 62 is advisable to supply suitable current to the control unit 38, the distribution valves 34, and other components of the system 10 requiring DC current to operate. The system 10 may also include a switch 64 for the selective application of electrical power to the system 10 from the backup electrical power supply 56.

The multipurpose fluid distribution system 10 of the present invention may also include a remotely located control unit 66 situated away from the control unit 38. The remote control unit 66 may be configured to override the control unit 38 from a safe distance in the event of a wildland fire. As shown in FIG. 1, the remote control unit 66 could be a personal computer 66A located at an offsite location in a facility accessible to the property owner. Alternatively, the remote control unit 66 may be located at a dedicated control and monitoring station 66B housing personnel engaged by the property owner to monitor the alarm status of the subject property.

Since it is possible that telephone lines or other conventional communication links between the multipurpose fluid distribution system 10 and any remote control unit 66 will be disrupted in the event of a wildland fire, it is desirable that a remote control unit 66 communicate with the control unit 38 via a wireless link 68. An embodiment of the present invention implemented with a control unit 38, backup power supply 56, remote control unit 66, and wireless link 68, all as described above, will have the capability to automatically implement fire control activities even though all normal utility services have been disrupted to the subject property. In addition, the remote control unit 66 will provide for supplemental human supervision and control of fire control efforts from a safe location.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

EXAMPLE 1

Example of the Present Invention in an Automated State Distributing Fire Retardant Due to the nature of wildland fires, exterior fire retardant may need to be applied at a time when a person is not available to manually activate the system. The system of the present invention is designed to identify the need to apply fire retardant and automatically initiate the system. The system of the present invention employs a humidity sensor that measures a drop in humidity. The amount of drop in humidity that will initiate the system will vary depending on the average atmospheric conditions found in an area as well as the time of year. A drop may range anywhere from 1 or 2 percentage points to a 50% or 90% drop in humidity. Once a drop in humidity is identified, to be a threat for a wildland fire, the system of the present invention is activated, and fire retardant is distributed to the exterior of a structure and/or landscape to prevent a fire.

EXAMPLE 2

Example of the Present Invention in an Automated State Distributing Fire Suppressant Due to the nature of wildland fires, exterior fire suppressant may need to be applied at a time when a person is not available to manually activate the system. The system of the present invention is designed to identify the need to apply fire suppressant and automatically initiate the system. The system of the present invention employs fire sensors, such as an infrared sensor, a heat sensor, or a temperature sensor. The fire sensor detects the presence of a fire, such as increased heat or flames, and triggers the activation of the system. The system of the present invention is then triggered and fire suppressant is distributed to put out the fire on the premises.

EXAMPLE 3

Example of the Present Invention Distributing Fire Retardant

Another aspect of the present invention is the systems ability to accurately and timely distribute the fire retardant prior to the fire reaching the premises but also before the chemical components of the fire retardant break down and become ineffective. Many commercially available fire retardants are limited in the length of time the retardant will be viable after the chemical components of the fire retardant have been mixed together. One unexpected aspect of the present invention is the ability of the present invention to sense the presence of an approaching wildland fire and to distribute the fire retardant before it begins to break down and become inviable. The system of the present invention uses a humidity sensor to detect a precipitous drop in humidity. Once a precipitous drop in humidity has been detected, the system of the present invention initiates the agitation of the fire retardant. Once the fire retardant has been fully agitated, the fire retardant is then dispersed to the proper external structures and landscapes prior to the arrival of a fire.

EXAMPLE 4

Use of the Humidity Sensor to Detect a Fire Long Before the Fire Reaches an Area Another unexpected aspect of the present invention is the ability to detect the presence of a fire long before the fire actually reaches an area. One of the most dangerous aspects of a wildland fire is the ability of floating embers to travel great distances, even miles, landing and igniting random spot fires. These floating embers are responsible for many homes that burn down in wildland fires. The system of the present invention uses a humidity sensor to detect the presence of a wildland fire by detecting a precipitous drop in humidity. Once a precipitous drop in humidity has been detected, the system of the present invention initiates the agitation of the fire retardant. Once the fire retardant has been fully agitated, the fire retardant is then dispersed to the proper external structures and landscapes before the fire and the flying embers reach the premises.

EXAMPLE 5

Use of Water Soluble and Biodegradable Fire Retardant and Suppressant

Another aspect of the present invention is the use of water soluble and biodegradable fire retardants and fire suppressants. Water soluble and biodegradable retardants and fire suppressants are designed to remain viable long enough to protect an area from a fire but are easily washed off and quickly degrade. Because plants and other materials on a premises are not exposed to long durations of contact with a fire retardant, the harm from the fire retardant and fire suppressants to plants and other materials is limited.

EXAMPLE 6

Use of Sensors to Locate Specific Fire Locations

Another important and unexpected aspect of the present invention is the ability of the system to identify a fire and efficiently distribute fire suppressant to an area without exhausting the fire suppressant supplies. The system of the present invention uses fire sensors, such as an infrared fire sensor, to monitor and quickly identified hot spots. Based on information from the infrared fire sensor, the system of the present invention is able to quickly identify the location of a fire and immediately distribute fire suppressant to that exact location without wasteful distribution of suppressant to other locations that are not impacted by a wildland fire.

EXAMPLE 7

Use of a Variable Speed Pump to Maintain the Correct Amount of Pressure in the System of the Present Invention Another unexpected aspect of the present system is the systems ability to evenly and accurately distribute fluids with different viscosities and weights to different areas of a landscape including, but not limited to, water, fire retardants, and fire suppressants. Because the system of the present invention must supply fire suppressant or fire retardant with ample pressure to more than one area or zone, the system is designed to identify and immediately adjust the system to the pressure necessary to distribute the specific fluid to be applied to an area. Once the specific pressure needed for an area has been identified, the system communicates and controls the variable speed pump to supply the appropriate pressure to the appropriate areas.

EXAMPLE 8

Use of Compressed Air to Purge the System of Remaining Fluids for Fire Retardant and Fire Suppressant is Sent Through the System Another unexpected aspect of the present invention is the use of compressed air to purge the system of any remaining water that may be present from an irrigation event. Since the system of the present invention is a dual purpose system, distributing water for irrigation purposes in daily use while distributing multiple fluids in the same piping during wildland fire events, the system needs to remove any excess materials before transitioning from one use to another. Once a fire event has been identified, the system of the present invention switches to wildland fire fighting mode. The system of the present invention will then automatically signal the air compressor to send compressed air through the system to remove any remaining water from a previous irrigation event, thereby clearing the system to allow the clean flow of any fire retardant or fire suppressant.

EXAMPLE 9

Use of Compressed Air to Prepare the Present Invention for Winter Conditions The system of the present invention has the ability to purge itself of remaining fluids in order to prepare the system for winter conditions. Because cold temperatures can cause remaining fluids in the system to freeze, which can expand and cause damage to the system, the system of the present invention is designed to purge the system of the remaining fluids. The system of the present invention uses an air compressor to send forced air through the system to remove any remaining fluids. Because the system of the present invention needs to remain available during the winter should a fire approach the area, the fluids, including fire retardant and fire suppressant, is kept available during the winter by circulating the fluids through an in-line heater, or storing the fire suppressant and fire retardant in a heated enclosure.

EXAMPLE 10

Ability of the Present Invention to Prioritize the Need for Fire Protection Over a Scheduled Irrigation Event Another aspect of the system of the present invention is the systems ability to prioritize which mode, irrigation or fire fighting, the system should be in. The system of the present invention is by default designed to automatically be in the irrigation mode. But once the system of the present invention identifies a potential fire approaching the area, the system automatically switches from irrigation mode to fire protection mode. A manual override is also provided to allow an individual person to switch the system from irrigation mode to fire fighting or from fire fighting mode to irrigation mode.

EXAMPLE 11

Ability of the Present Invention to Work Without Electricity For Long Periods of Time Another aspect of the system of the present invention is the ability of the system to continue to function even when electricity is not available to the system for long periods of time. The system of the present invention has a backup power supply which includes a generator, a solar powered battery, and a backup water supply. The generator is in communication with the system of the present invention while the backup battery provides additional power to the generator and the control unit. With the addition of the water holding tank, the backup generator, and the battery, the system of the present invention is able to continue to monitor and protect an area even when electricity is not available to an area.

EXAMPLE 12

Ability of the Present Invention to Cleanup the Premises After a Fire Fighting Event Another unexpected aspect of the present invention is the ability of the system to remove or wash away the biodegradable or water soluble fire retardants or fire suppressants. Once the system of the present invention has switched to fire fighting mode, the system will continue to monitor and fight fires on the premises until a person manually switches the system back to irrigation mode. Once the system has been switched back to the irrigation mode, the system will initiate the air compressor to purge the system of any remaining fire retardants and fire suppressants. The system will then begin to send water throughout the system to distribute water to remove fire retardant and fire suppressant from the landscape and the outside of the structures.

What is claimed is:

1. A multipurpose fluid distribution system comprising:
   a network of fluid distribution heads associated with a landscape or the outside of a structure;
   a series of distribution valves in fluid communication with the network of fluid distribution heads;
   a water supply in fluid communication with the series of distribution valves;
   a control unit operatively associated with the series of distribution valves configured to open select distribution valves under pre-determined conditions for the routine irrigation of the landscape;
   an air compressor in fluid communication with the series of distribution valves;
   a fire retardant supply;
   at least one humidity sensor configured to provide an input to the control unit upon detection of a decrease in humidity;
   said air compressor in fluid communication with the series of distribution valves such that input from said humidity sensor causing the control unit to send compressed air through the system;
   said fire retardant supply in fluid communication with the series of distribution valves such that input from said humidity sensor causes the control unit to open select distribution valves for the application of said fire retardant to the outside of the structure or landscape;
   a fire suppressant supply in fluid communication with the series of distribution valves;
   at least one fire sensor configured to provide an input to the control unit upon detection of a fire wherein said fire sensor is selected from the group consisting of a temperature sensor and a heat sensor;
   said air compressor in fluid communication with the series of distribution valves such that input from said fire sensor causes the control unit to send compressed air through the system;
   the input from said fire sensor causing the control unit to open select distribution valves for application of fire suppressant to the outside of the structure or the landscape for fire control;
   and a variable speed pump in fluid communication with the water, fire retardant, fire suppressant and air supply and the series of distribution valves.

2. The multipurpose fluid distribution system of claim 1 further comprising said fire retardant supply in fluid communication with the series of distribution valves such that input from said humidity sensor causes the control unit to open select distribution valves for the application of fire retardant to the outside of the structure or landscape.

3. The multipurpose fluid distribution system of claim 2 further comprising a mixing valve in fluid communication with the water supply, the fire retardant supply and the series of distribution valves, such that input from said humidity sensor causes the control unit to open select distribution valves causing the application of a mixture of water and fire retardant to the outside of the structure or landscape.

4. The multipurpose fluid distribution system of claim 1 further comprising said fire suppressant supply in fluid communication with the series of distribution valves such that input from said fire sensor causes the control unit to open select distribution valves for the application of fire suppressant to the outside of the structure or landscape.

5. The multipurpose fluid distribution system of claim 4 further comprising a mixing valve in fluid communication with the water supply, and fire suppressant supply and the series of distribution valves, such that input from the fire sensor causes the control unit to open select distribution valves for the application of a mixture of water and fire suppressant to the outside of the structure or landscape.

6. The multipurpose fluid distribution system of claim 1 further comprising a remote control unit located away from the control unit and in communication with the control unit, the remote control unit being configured to send commands to the control unit causing the control unit to open select distribution valves for non-routine application of water to the outside of the structure or landscape for fire control.

7. The multipurpose fluid distribution system of claim 6 further comprising a wireless communication link between the remote control unit and the control unit.

8. The multipurpose fluid distribution system of claim 1 wherein the system further comprises a precipitation sensor in communication with the control unit.

9. A method of applying fluid to an outside of the structure or landscape comprising:
   providing a network of fluid distribution heads in association with the outside of the structure or landscape;
   providing a series of distribution valves in fluid communication with the network of fluid distribution heads;
   providing a water supply in fluid communication with the series of distribution valves;
   a mixing valve in fluid communication with the series of distribution valves;
   a water supply in fluid communication with the mixing valve;
   providing a control unit operatively associated with the series of distribution valves;
   an air compressor in fluid communication with the series of distribution valves;
   a fire suppression supply in fluid communication with the mixing valve;
   a fire retardant supply;
   at least one humidity sensor configured to provide an input to the control unit upon detection of a decrease in humidity;
   said air compressor in fluid communication with the series of distribution valves such that input from said humidity sensor cause the control unit to send compressed air through the system;

said fire retardant supply in fluid communication with the mixing valve such that input from said humidity sensor causes the control unit to open select mixing valve for the application of a fire retardant to the outside landscape comprising a lawn, open field, roof top, bedding plant zone, a perimeter or exterior wall;

opening select distribution valves under predetermined conditions for the routine irrigation of the landscape with water from the water supply;

providing at least one fire sensor configured to provide an input to the control unit upon detection of a fire wherein said fire sensor is selected from the group consisting of a temperature sensor and a heat sensor;

said air compressor in fluid communication with the series of distribution valves such that input from said fire sensor cause the control unit to send compressed air through the system;

opening select distribution valves for non-routine application of water to the structure or the landscape upon transmission of an input from the fire sensor to the control unit indicating a fire event; and a variable speed pump in fluid communication with the water supply and the series of distribution valves.

* * * * *